United States Patent
Forster

(10) Patent No.: US 10,401,234 B2
(45) Date of Patent: Sep. 3, 2019

(54) SENSOR WITH CONTROLLABLE THERMAL CONTACT FOR TEMPERATURE MONITORING

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/686,568

(22) Filed: Aug. 25, 2017

(65) Prior Publication Data
US 2018/0038743 A1 Feb. 8, 2018

Related U.S. Application Data

(62) Division of application No. 14/054,191, filed on Oct. 15, 2013, now Pat. No. 9,746,382.

(60) Provisional application No. 61/714,365, filed on Oct. 16, 2012.

(51) Int. Cl.
*G01K 7/36* (2006.01)
*G01K 1/16* (2006.01)

(52) U.S. Cl.
CPC ............ *G01K 7/36* (2013.01); *G01K 1/165* (2013.01)

(58) Field of Classification Search
None
See application file for complete search history.

(56) References Cited

U.S. PATENT DOCUMENTS

| 5,816,706 A | 10/1998 | Heikkiia et al. |
| 6,000,846 A | 12/1999 | Gregory et al. |
| 6,280,397 B1 | 8/2001 | Yarden et al. |
| 6,886,978 B2 | 5/2005 | Tokita et al. |
| 7,020,508 B2 | 3/2006 | Stivoric et al. |
| 2006/0056487 A1 | 3/2006 | Kuroda |

(Continued)

FOREIGN PATENT DOCUMENTS

| WO | 2008068665 | 6/2008 |
| WO | 2008078271 | 7/2008 |
| WO | 2009107009 | 9/2009 |

*Primary Examiner* — Erica S Lin
(74) *Attorney, Agent, or Firm* — Avery Dennison Retail Information Services, LLC

(57) ABSTRACT

Devices and methods are provided for determining the temperature of an object. Such devices and methods incorporate first and second thermally conductive members, with a heating member associated with the first thermally conductive member. The second thermally conductive member is positionable adjacent to the object. The heating member is heated to a known temperature and a probe member is alternately brought into contact with the first and second thermally conductive members. When the probe member is in contact with one of the thermally conductive members, it will send an input to the controller. The controller compares the inputs to each other and, if they are not substantially equal, changes the temperature of the heating member, and the probe member is again alternately brought into contact with the thermally conductive members. When the inputs are substantially equal, the controller generates an output based on the temperature of the heating member.

12 Claims, 1 Drawing Sheet

(56) References Cited

U.S. PATENT DOCUMENTS

| | | | |
|---|---|---|---|
| 2006/0084854 A1* | 4/2006 | Cho | A61B 5/01 600/365 |
| 2006/0216833 A1* | 9/2006 | Pagoria | B01L 3/5023 436/514 |
| 2008/0309339 A1* | 12/2008 | Chisholm | G01N 24/087 324/315 |
| 2009/0296769 A1* | 12/2009 | Fiennes | G01K 7/425 374/1 |
| 2012/0113594 A1 | 5/2012 | Goettert | |

* cited by examiner

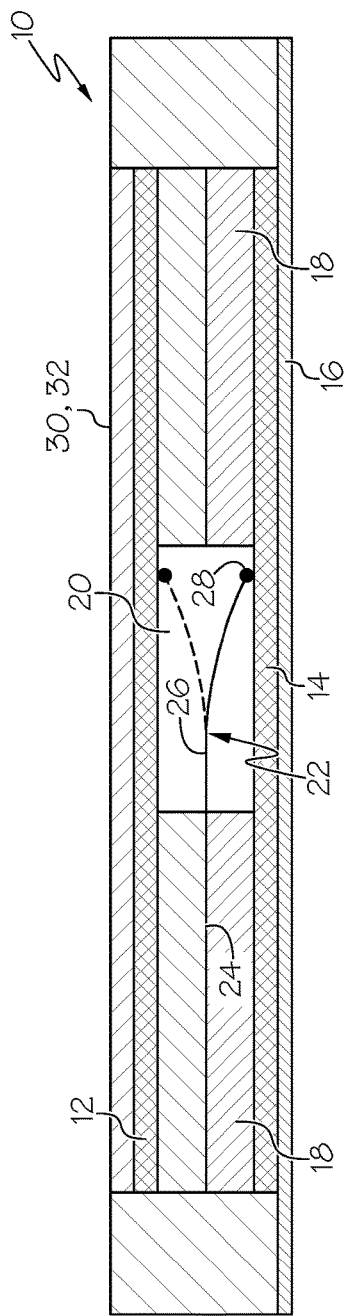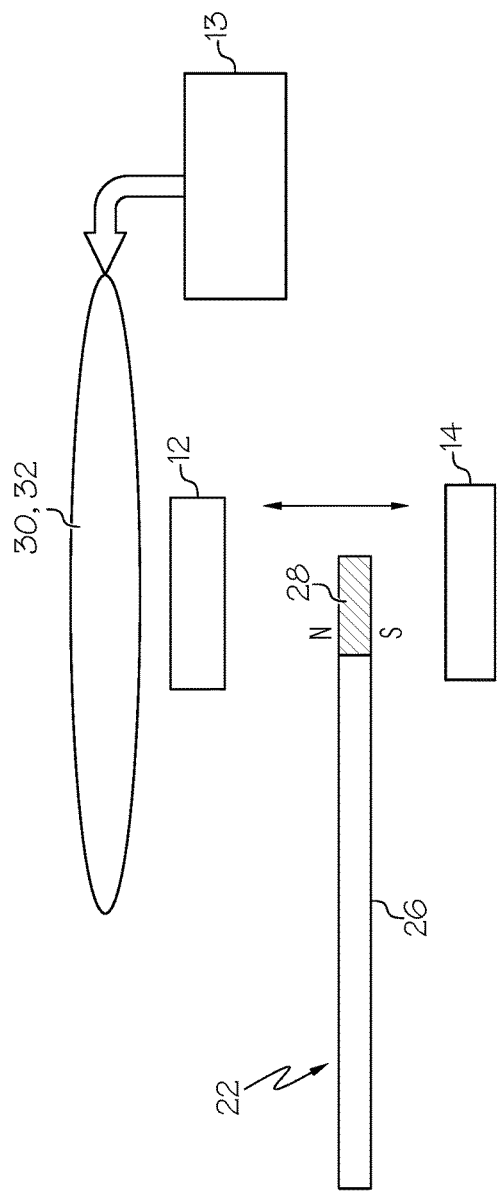

SENSOR WITH CONTROLLABLE THERMAL CONTACT FOR TEMPERATURE MONITORING

CROSS-REFERENCE TO RELATED APPLICATIONS

The present application is a divisional of U.S. Pat. No. 9,746,382 granted as of Aug. 29, 2017, which claims the benefit of U.S. Provisional Application No. 61/714,365 filed Oct. 16, 2012, each of which is incorporated herein by reference in its entirety.

FIELD OF THE INVENTION

The present subject matter relates to devices for assisting in treatment including measuring temperature. More particularly, the present subject matter relates to devices for measuring the temperature of a human body.

BACKGROUND OF THE INVENTION

Numerous devices and methods are known for measuring the temperature of an object, particularly the temperature of a human body. According to one class of devices, a plurality of temperature sensors are provided, with at least one sensor contacting the body and at least one other sensor spaced away from the body and separated from the first sensor by a thermal barrier or insulator. The measurements recorded by the separate sensors are compared to each other to derive the body temperature. Examples of known measuring devices according to this construction are described in PCT Application Publication Nos. WO 2008/068665 and WO 2008/078271 to Padiy et al. and WO 2009/107009 to Padiy, all of which are incorporated herein by reference.

Such known measuring devices and methods may be disadvantageous in that they are relatively complex and costly, requiring several components, including a plurality of temperature sensors. Accordingly, it would be advantageous to provide simplified measuring devices and methods.

Brief Summary of the Invention

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a device for determining the temperature of an object includes first and second thermally conductive members. A heating member is associated with the first thermally conductive member, while the second thermally conductive member is positionable generally adjacent to the object. The heating member is adapted to be heated to a known temperature. The device further includes a probe member and a controller associated with the probe member. The probe member is movable into and out of contact with the first and second thermally conductive members. The controller is programmed to determine the temperature of the object based, at least in part, on a first input (which is received from the probe member when the probe member is in contact with the first thermally conductive member) and a second input (which is received from the probe member when the probe member is in contact with the second thermally conductive layer).

In another aspect, a method of determining the temperature of an object includes positioning a first thermally conductive member generally adjacent to a heating member and positioning a second thermally conductive member generally adjacent to the object. A probe member is moved into contact with the first thermally conductive member to generate a first input and into contact with the second thermally conductive member to generate a second input. The temperature of the object is determined based, at least in part, on the first and second inputs. The inputs can be similar or distinct from one another.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These as well as other objects and advantages of this invention, will be more completely understood and appreciated by referring to the following more detailed description of the presently preferred exemplary embodiments of the invention in conjunction with the accompanying drawings, of which:

FIG. 1 is a schematic diagram of a temperature-measuring device according to an aspect of the present disclosure; and FIG. 2 is a schematic diagram of the probe member and selected associated components of the temperature-measuring device of FIG. 1.

DETAILED DESCRIPTION OF THE ILLUSTRATED EMBODIMENTS

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

FIG. 1 is a schematic cross-sectional view of a temperature-measuring device 10 according to an aspect of the present invention. FIG. 2 is a schematic diagram of the probe member and selected associated components of the temperature-measuring device. While various components of the device 10 are illustrated in FIGS. 1 and 2, it will be understood that the device 10 may include additional components or elements which are not illustrated, but may be desirable for optimal functionality of the device 10 (e.g., a power source, interconnections between various illustrated components, signal converters, adhesive/release layers, and the like).

The device 10 includes a first thermally conductive member or layer 12 which is spaced away from a second thermally conductive member or layer 14. It may be advantageous for the thermally conductive members 12 and 14 to be constructed of a flexible material to allow them to conform to the surface of the object whose temperature is to be measured. For example, in applications involving the determination of the temperature of mammal, such as a patient, it may be advantageous for one or both of the thermally conductive members 12 and 14 to be sufficiently flexible that they can conform to the curvature of an appendage or surface such as a forehead. In the illustrated embodiment, the second thermally conductive member 14 is adapted to be positioned generally adjacent to the body (e.g., being secured thereto by an adhesive layer 16), so it may be particularly advantageous for it be flexible. Suitable materials for the thermally conductive members 12 and 14 include films, foils and the like which may be variously provided, including in the form of a mesh layer.

The thermally conductive members 12 and 14 are spaced from each other by a thermal insulator 18, which may be constructed from any of a number of materials including, but not limited to plastic foams, pads, films and other cellulosic materials. It is typically advantageous that such materials are flexible or capable of bending without breaking or deterioration in the functionality of the device. The device 10 includes an uninsulated region or cavity 20 which omits the insulator 18, that is the insulator 18 does not extend into the cavity, leaving a portion of the thermally conductive members 12 and 14 exposed and in facing relationship to each other. The uninsulated region 20 may be implemented in a variety of ways, such as by providing separate insulators which are spaced from each other by a gap (i.e., the uninsulated region 20) or by providing a single insulator with a cut-out or passage which defines the uninsulated region 20. Other methods of providing an uninsulated region 20 may also be employed without departing from the scope of the present disclosure.

A probe member 22 extends into the uninsulated region 20. The probe member 22 has a fixed or anchored portion 24 (illustrated in FIG. 1 as being secured within the insulator 18) and a free portion 26. The fixed portion 24 is associated with a controller (not illustrated) which is programmed to perform a variety of functions and generally direct the operation of the device 10, as will be described in greater detail herein.

The free portion 26 of the probe member 22 is generally straight or linear and may be positioned midway between the thermally conductive members 12 and 14 when in an initial, neutral, or equilibrium condition (FIG. 2). The free portion 26 of the probe member 22 is sufficiently elongated and sufficiently flexible that it may deflect to move into contact with the thermally conductive members 12 and 14. For example, FIG. 1 illustrates in broken lines a condition wherein at least part of the free portion 26 is in contact with the first thermally conductive member 12, while illustrating in a solid line a condition wherein at least part of the free portion 26 is in contact with the second thermally conductive member 14. It should be understood that the two conditions shown in FIG. 1 are alternative and the probe member 22 is not configured to simultaneously contact both of the thermally conductive members 12 and 14 by contact point of the temperature sensor 28, which is why one condition is shown in a phantom configuration (dotted line).

As will be described in greater detail herein, the probe member 22 will contact either only the first thermally conductive member 12 (as shown in broken lines in FIG. 1), only the second thermally conductive member 14 (shown as a solid line in FIG. 1), or neither of the thermally conductive members 12 and 14 (FIG. 2). Accordingly, it may be advantageous for the probe member 22 to be a beam comprised of a flexible material such as rubber or rubberized composite, plastics such as polyester based materials and the like, although the probe member 22 may be variously provided without departing from the scope of the present disclosure.

The probe member 22 includes a temperature sensor 28 which is positioned to contact the thermally conductive members 12 and 14 in the conditions of FIG. 1. In one embodiment, the temperature sensor 28 is a thermistor positioned at or adjacent to the outermost end of the free portion 26 of the probe member 22, with suitable connections for transmitting a signal to the controller. The thermistor 28 may function according to known design, with a resistance that varies according to its temperature. The signal or input which the thermistor 28 transmits to the controller is its resistance, and the controller is programmed to determine the temperature of the thermistor (and, hence, the temperature of the object with which the thermistor is in contact when the input is generated) based on the resistance of the thermistor. The process by which the controller uses the input from the thermistor to determine the temperature of a body will be described in greater detail herein.

The temperature of the second thermally conductive member 14 will be substantially equal to the temperature of the body, as the second thermally conductive member 14 is positioned against or adjacent the body in use. As for the temperature of the first thermally conductive member 14, it is dictated by a heating member 30 associated therewith. The heating member 30 is controlled by the controller, which functions to bring the heating member 30 (and, hence, the adjacent first thermally conductive member 12) to a known temperature. The heating member 30 may be variously configured (e.g., as a heater coil) and its temperature may be adjusted by any suitable means, including chemical or electrical means, without departing from the scope of the present disclosure.

As described above, the free portion 26 of probe member 22 is movable into contact with the thermally conductive members 12 and 14. This may be achieved by any of a number of means, but in one embodiment, the free portion 26 of the probe member 22 includes magnetic poles (FIG. 2) and is moved into contact with the thermally conductive members 12 and 14 under influence of a magnetic field. In such an embodiment, the device 10 includes a magnetic field-generating element 32 configured to generate first and second magnetic fields. The magnetic field-generating element 32 may include an electromagnet and may be incorporated in the heating member 30.

The magnetic field-generating element 32 may be configured to periodically alternate between generating the first magnetic field and the second magnetic field. This may be achieved by the controller sending an alternating current signal B (FIG. 2) to the magnetic field-generating element 32. As the charge changes direction, so does the direction of the magnetic field, such that the direction of the first magnetic field will be generally opposite to the direction of the second magnetic field. Under influence of the first magnetic field, the magnetic poles of the probe member 22 will cause the temperature sensor 28 to move into contact with the first thermally conductive member 14 (as shown in the broken lines of FIG. 1). Conversely, the magnetic poles of the probe member 22 will cause the temperature sensor 28 to move into contact with the second thermally conductive member 14 (shown as a solid line in FIG. 1) under influence of the second magnetic field. Therefore, the temperature sensor 28 of the probe member 22 will alternate between contacting the thermally conductive member 12 and the thermally conductive member 14 at a frequency substantially equal to the frequency of the alternating current signal B received by the magnetic field-generating element 32. This type of contact variation can considered to be automatic toggle action.

In one method of using the illustrated device 10, the device 10 is positioned against the body, with the second thermally conductive member 14 proximal to the body and the first conductive member 12 distal to the body. The device 10 may be secured to the body by any of a number of suitable means, including the illustrated adhesive layer 16. Typically, the device 10 is positioned against the skin where temperature can be reliably obtained such as on the forehead of a human subject. As the object or body is positioned adjacent to the second thermally conductive member 14, the temperature of the two will be substantially equal.

When the device 10 has been properly positioned, the controller operates the heating member 30 to bring it to a known temperature (which may approximate an expected body temperature for a human, such as 98.6° F.). As the heating member 30 is positioned directly adjacent to the first thermally conductive member 12, the temperature of the two will be substantially equal.

The alternating current signal B may be sent to the magnetic field-generating element 32 either when the temperature of the heating member 30 is increasing or after the heating member 30 reaches the target temperature. When the magnetic field-generating element 32 receives the alternating current signal B, it will generate periodically alternating first and second magnetic fields, as described above. The alternating magnetic fields act upon the magnetic poles of the probe member 22 to move the temperature sensor 28 of probe member 22 into alternating contact with the first thermally conductive member 12 (when the first magnetic field is being generated) and the second thermally conductive member 14 (when the second magnetic field is being generated). This can be considered to achieve automatic toggle action.

The temperature sensor 28 comes into contact with one of the thermally conductive members 12 or 14 and generates a signal or input. The signal which the temperature sensor 28 generates when in contact with the first thermally conductive member 12 is referred to herein as a first input, while the signal generated when the temperature sensor 28 is in contact with the second thermally conductive member 14 is referred to herein as a second input. When the temperature sensor 28 is a thermistor, the inputs are equal to or indicative of the resistance of the thermistor.

The controller receives the first and second inputs and compares them to each other. If the inputs are substantially equal to each other, the controller will recognize that the temperatures of the thermally conductive members 12 and 14 are substantially equal to each other. When the controller detects such a zero heat flux state, it will generate an output based on the known temperature of the heating member 30, which is substantially equal to the temperature of the object or body. The output from the controller may be sent to an associated display (not illustrated) for a visual indication of the temperature of the object. The measured temperature may be quite accurate, with the absolute value of the thermistor resistance giving the temperature to within 0.2° C. (approximately 32° F.).

On the other hand, if the inputs are not substantially equal to each other, the controller operates the heating member 30 to bring it to a different known temperature. The controller may determine in which direction to change the temperature of the heating member 30 based on the nature of the temperature sensor 28. For example, if the temperature sensor 28 is a thermistor whose resistance increases with temperature, then the controller will increase the known temperature when the second input is greater than the first input (because the resistance of the thermistor is greatest when it is in contact with the second thermally conductive member 14, indicating that the body temperature is greater than the temperature of the heating member 30). When the second input is less than the first input, the controller will decrease the known temperature (because the resistance of the thermistor is greatest when it is in contact with the first thermally conductive member 12, indicating that the body temperature is less than the temperature of the heating member 30). The controller will have the opposite reactions if the temperature sensor 28 is a thermistor whose resistance decreases when its temperature increases. The magnitude of the temperature adjustment may be based on the magnitude of the difference between the first and second inputs detected by the controller. In this way, the controller is capable of making large initial adjustments to quickly approximate the temperature of the object and then making smaller subsequent adjustments to more accurately determine the temperature of the object once the temperature has been initially approximated.

When the heating member 30 reaches the prescribed known temperature, the controller again considers the first and second inputs and generates an output if they are substantially equal to each other. If the inputs are still not substantially equal to each other, the controller repeats the process of changing the known temperature and considering the inputs until the inputs are substantially equal to each other, at which time it generates the above-described output.

A number of variations to the foregoing method may be practiced without departing from the scope of the present disclosure. For example, the alternating current signal B may be continuously or selectively sent to the magnetic field-generating element 32 (FIG. 2). If the signal B is continuous, the temperature sensor 28 will periodically generate inputs, even when the controller is moving the heating member 30 from one known temperature to another, which may be useful in monitoring the ongoing progress of the device 10. Alternatively, if the signal B is only applied at certain times (e.g., being generated only when the heating member 30 is at a target temperature and not when the temperature of the heating member 30 is being adjusted) that will decrease the energy required to operate the device 10.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A method of determining the temperature of an object, comprising:
   (a) providing and positioning a first thermally conductive member generally adjacent to a heating member;
   (b) positioning a second thermally conductive member generally adjacent to the object, and where the first and second thermally conductive members are flexible to conform to the surface of the object;
   (c) moving a probe member into contact with the first thermally conductive member to generate a first input while same is out of contact with the second thermally conductive member;
   (d) moving the probe member into contact with the second thermally conductive member to generate a second input while same is out of contact with the first thermally conductive member; and
   (e) determining the temperature of the object based, at least in part, on the first and second inputs.

2. The method of claim 1, wherein said (a) positioning includes setting the temperature of the heating member to a known temperature.

3. The method of claim 2, wherein said (a) positioning includes setting the temperature of the heating member to a known temperature chemically.

4. The method of claim 2, wherein said (a) positioning includes setting the temperature of the heating member to a known temperature electrically.

5. The method of claim 2, wherein said (e) determining includes comparing the first input to the second input.

6. The method of claim 5, wherein said (e) determining includes adjusting the temperature of the heating member to a different known temperature if the first input is not substantially equal to the second input and repeating said (c) through (e) until the first input is substantially equal to the second input.

7. The method of claim 6, wherein said (e) determining includes periodically alternating between said (c) moving and said (d) moving until the first input is substantially equal to the second input.

8. The method of claim 6, further comprising generating an output based on the temperature of the heating member when the first input is substantially equal to the second input.

9. The method of claim 1, wherein said (c) moving includes generating a first magnetic field to move the probe member into contact with the first thermally conductive member and said (d) moving includes generating a second magnetic field to move the probe member into contact with the second thermally conductive member.

10. The method of claim 1, wherein the first and second thermally conductive members are flexible.

11. The method of claim 1, wherein the first and second thermally conductive members are spaced from each other by a thermal insulator.

12. The method of claim 1, wherein the first input and the second input are equal to or indicative of a resistance of a thermistor.

* * * * *